United States Patent
Czeck et al.

[19]

[11] Patent Number: 5,947,814
[45] Date of Patent: Sep. 7, 1999

[54] GARAGE CO VENTING SYSTEM

[76] Inventors: John Joseph Czeck; Jeffrey John Czeck, both of 956 Beacon La., Apple Valley, Minn. 55124; Thomas Raymond Moga, 10589 166 St. W., Lakeville, Minn. 55044

[21] Appl. No.: 09/045,805

[22] Filed: Mar. 23, 1998

[51] Int. Cl.⁶ .................................................. F24F 7/007
[52] U.S. Cl. ........................ 454/195; 454/239; 454/343
[58] Field of Search ................... 454/195, 239, 454/253, 343

[56] References Cited

U.S. PATENT DOCUMENTS

| | | | |
|---|---|---|---|
| 1,948,755 | 2/1934 | Gullicksen | 454/343 |
| 2,348,455 | 5/1944 | Daudelin . | |
| 4,326,453 | 4/1982 | LaBoda et al. . | |
| 4,412,478 | 11/1983 | Osher et al. . | |
| 4,770,087 | 9/1988 | Danley et al. . | |
| 4,819,551 | 4/1989 | Vole | 454/343 |

FOREIGN PATENT DOCUMENTS 6-174246   6/1994   Japan ................................... 454/195

*Primary Examiner*—Harold Joyce
*Attorney, Agent, or Firm*—Patent & Trademark Services; Thomas Zack; Joseph H. McGlynn

[57] ABSTRACT

A gas venting system with an electrically operated exhaust fan used in an enclosed garage to expel unwanted gases, especially carbon monoxide, to outside the garage and away from an attached residence. In a garage with a door opener with an automatically operative light fixture, power to operate the electrically operative fan is supplied from the connected light fixture, via an interconnected relay, during the normal preset time interval the door opener's light is operating.

6 Claims, 2 Drawing Sheets

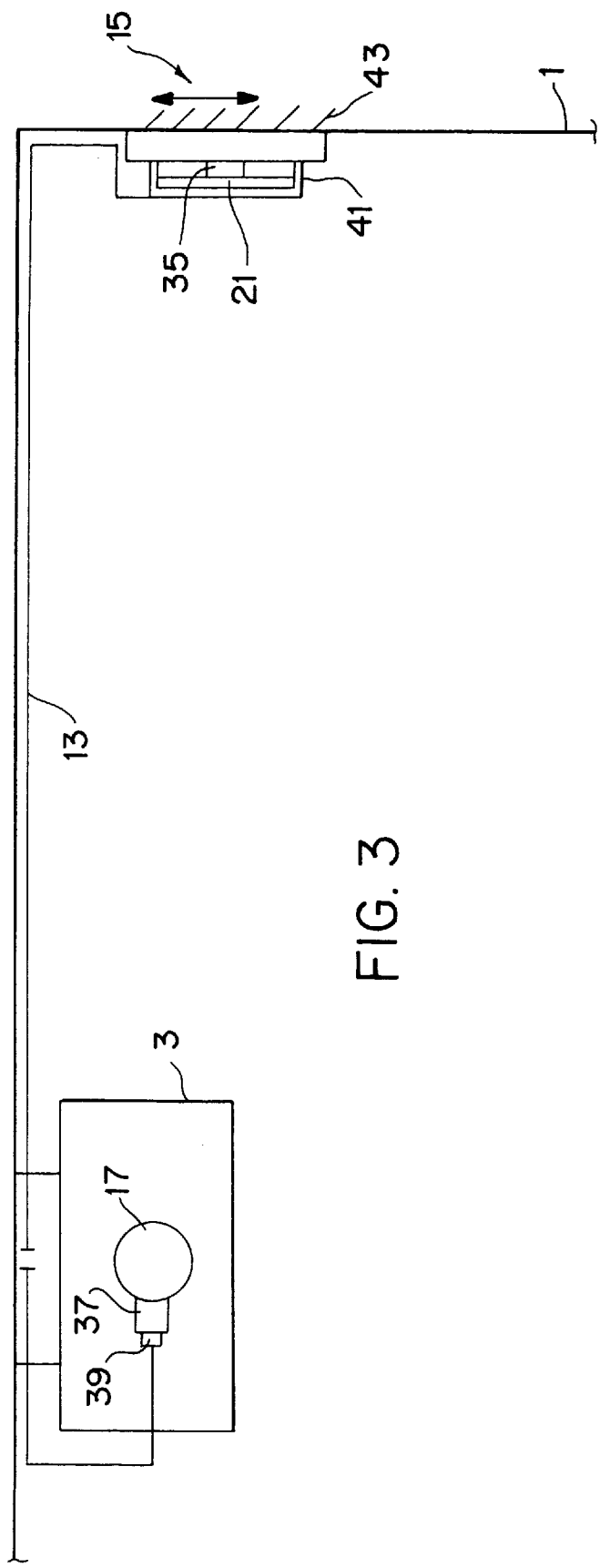
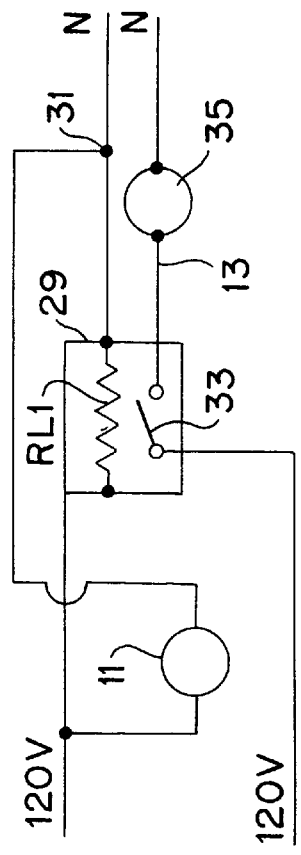
FIG. 3
FIG. 2

GARAGE CO VENTING SYSTEM

BACKGROUND OF THE INVENTION

For many years electrically operated fans have been used to ventilate undesirable gases and odors from residences and homes. This is particular true for rooms such as bathrooms, kitchens and attics. In more recent years other confined unhealthy gases, such as naturally occurring radon gas, have also resulted in fans being installed in different parts of the home (e.g., basements) to vent such gas to the outside.

Another very dangerous and chemically activate, colorless and odorless gas, carbon monoxide (CO), has received a lot of media attention due to its potential lethal consequences especially when residences are unable to properly exhaust of this gas to the outside. In many cases responsible homeowners have installed one or more carbon monoxide detectors to detect this odorless, colorless gas to alert them to its presence. However, a major source for CO is the gas emitted from the vehicle's exhaust of a gasoline powered internal combustion engine. In homes with attached garages, especially during cold weather when the vehicle's engine is left running to "warm" the engine, it is very possible that large concentrations of CO may accumulate in the garage and migrate into the adjoining residence. The present invention seeks to address this CO gas accumulation and migration problem by providing for a garage venting system which is operated by the electrical power supplied to a garage door opener's light all as more fully described hereafter.

DESCRIPTION OF THE PRIOR ART

Many different types of home venting systems are known. For example, in U.S. Pat. No. 2,348,455 to Daudelin the window mounted fan used ventilation system is portable and easily movable from room to room as needed to remove paint and other fumes from the house. In the LaBoda et al. reference (U.S. Pat. No. 4,326,453) a fan device for transferring air from a room's upper region through the open doorway to the exterior of the that room is disclosed. The Osher et al. invention (U.S. Pat. No. 4,412,478) describes a doorframe mounted fan used to circulate warm air into or out of a room to effect a more even heating or cooling of living and working areas. And in the Danley et al reference (U.S. Pat. No. 4,770,087) a garage door has a one or more louvered covered panels to vent its interior to the outside. The present invention is a garage venting system having an electrically operated fan used to vent air outside the garage whose louvered covered panels to vent its interior to the outside. The present invention is a garage venting system having an electrically operated fan used to vent air outside the garage whose operation is powered from electrical power supplied to the light fixture of a garage door opener as more further set forth in this specification.

SUMMARY OF THE INVENTION

This invention relates to a gas venting system used in a garage to expel unwanted gases outside the garage. A garage with a door opener and an automatically operative light fixture is used to power to supply electrical power to an electrically operative fan during the normal time interval power is supplied to the light fixture.

It is the primary object of the present invention to provide for an improved system to ventilate unwanted gases from a garage.

Another object is to provide for such a system wherein the operation of the system's exhaust fan is operative for the same time period that electricity is supplied to the light fixture of an automatic garage door opener.

These and other objects and advantages of the present invention will become apparent to readers from a consideration of the ensuing description and the accompanying drawings.

These and other objects and advantages of the present invention will become apparent to readers from a consideration of the ensuing description and the accompanying drawings.

BRIEF DESCRIPTION OF THE DRAWINGS

FIG. 2 is a circuit diagram interconnecting the existing light fixture of the automatic garage door opener and the ventilating fan for the garage used in the FIG. 1 schematic embodiment.

FIG. 3 shows a side view of a conventional garage door opener's light fixture with an adapter used to supply electrical power to a garage wall mounted ventilation fan.

DESCRIPTION OF THE PREFERRED EMBODIMENT

Figure 1:
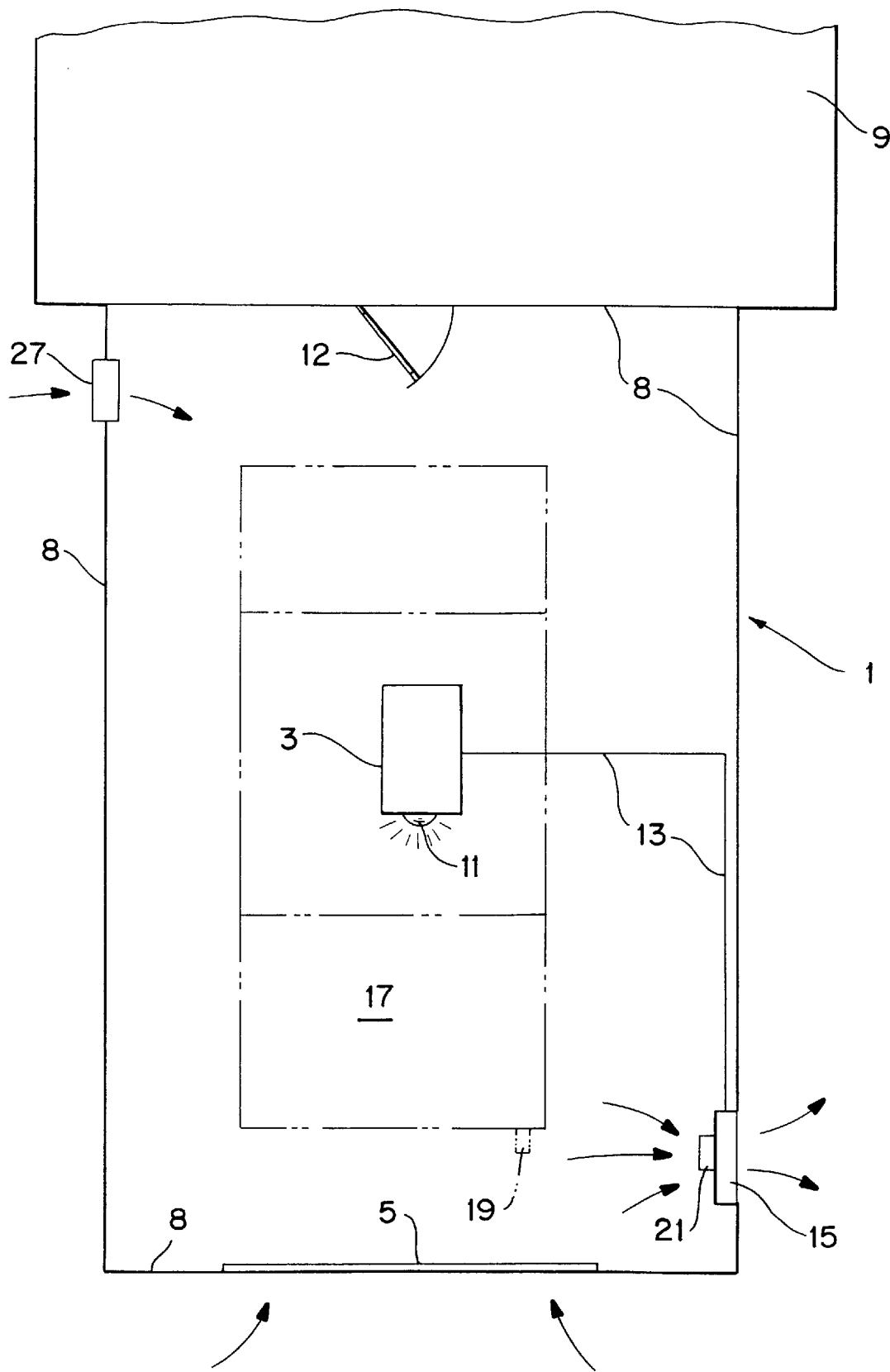
FIG. 1 is a top schematic view of how the invention's preferred embodiment system could be employed in a car garage with an overhead door opener.

A recent Dec. 11, 1996 newspaper article from the Minneapolis Star Tribune entitled "Minnegasco finds attached garage is overlooked source of CO" describes how vehicles provide a CO source for houses with garages. CO measured levels within the houses were directly related to the times a car was running in the garage and were worse during cold weather. In over 13,400 service calls carbon monoxide technicians from the local Minnesota gas utility, Minnegasco, found nothing wrong at 80 percent of the homes. Further, investigations at selected homes indicated that in 75 percent of the selected houses garages were the most likely source of CO that monoxide technicians from the local Minnesota gas utility, Minnegasco, found nothing wrong at 80 percent of the homes. Further, investigations at selected homes indicated that in 75 percent of the selected houses garages were the most likely source of CO that set off CO detector alarms. While this article is enlightening at pointing out the problem of CO in the home and its associated garage vehicle source, it offered no clear solution to controlling the problem. The present invention seeks to supply such a solution to this problem.

FIG. 1 is a top schematic view of how the invention's preferred embodiment system could be employed in a car garage 1 with an overhead mounted automatic garage door opener 3. This conventional enclosed garage has an overhead roof (not shown), one or more front garage doors 5 from which a vehicle or vehicles can enter or exit to a driveway and the street. A smaller door 7 may lead to an existing attached personal residence 9.

Garage and residence walls 8 extend around on all four sides of the garage except for where interrupted by the front garage door 5 or the house rear door 12. Also, schematically illustrated is a conventional electrically operated overhead light fixture 11, including its socket and bulb, associated with and forming part of the automatic garage door opener 3. When the garage door 5 is either raised or lowered this light fixture's bulb emits light for a preset time interval usually averaging about 4 minutes. The purpose, of course, is to supply sufficient visible light to the garage's interior to permit a vehicle's operator and passengers to get into or out of the vehicle under low light conditions. Such garage and associated door opener's and light fixtures are interior to permit a vehicle's operator and passengers to get into or out of the vehicle under low light conditions. Such garage and associated door opener's and light fixtures are conventional and well known.

In the present invention, connected to the opener's conventional light fixture 11 in bulb socket by a hard wire connection 13 is the side garage mounted electrically operated fan and gas vent assembly 15. This assembly functions to exhaust gases from inside the garage 1 when a vehicle 17 (shown in dotted line format) has its engine running to emit CO from its exhaust pipe 19.

As will be described in greater detail hereafter, the electrically operated fan 21 forming part of the vent assembly 15 is operative to exhaust gas only during this predetermined time interval power is being supplied to the opener's light fixture 11. Thus, if the predetermined operative time interval for supplying electrical power to light fixture 11 averages 4 minutes, then power will also be supplied for this same interval to the electrically operated fan 21 to exhaust gas from inside the garage to outside the garage and away from the attached residence 9. The arrows indicate this gas flow into and out of the garage. Usually a series of spaced downwardly outside slating parallel movable venting slats, whose opening and closing are synchronized with the fan's operation, can be used to provide a gas communication link to outside the garage. Both a fan protective screen and a bug screen may also be incorporated into this assembly. All such sub components structures are considered part of the vent assembly 15.

Also, shown in FIG. 1 is the air intake 27 usable with a triggering mechanism used to operate the fan 21 to permit outside fresh air to be taken into the garage. This vent assembly 15.

Also, shown in FIG. 1 is the air intake 27 usable with a triggering mechanism used to operate the fan 21 to permit outside fresh air to be taken into the garage. This outside air intake can be an upper side garage mounted hole in the garage's side with an outside protective cover hood and screen hole covering. A one way flap valve may be incorporated into the intake assembly to permit ambient outside air to be taken into the garage but prevent its withdrawal through the same gas inlet.

In one embodiment similar to that shown in FIG. 1, the exhaust vent fan 21 was rated at 1290 cubic feet per minute (CFM) capacity for a two car garage having a volume of about 5000 cubic feet. The fan's capacity to properly vent gas from inside the garage to outside is selected based on the volume of the garage to be vented in a given time frame.

FIG. 2 is a circuit diagram between the existing light fixture of a automatic garage door opener and the ventilating fan 21 for the garage 1 used in the FIG. 1 schematic embodiment. Typically, a 120 volt (v) household current source supplies power to operate both the light 11 and its conventional associated garage door opener.

When the connected garage door is either opened or closed by the door opener 3, the light 11 is initially supplied electrical power from the residence to cause its bulb to light. This power is supplied to the bulb for a preset time interval that usually ranges from 3 to 5 minutes (average of 4 minutes) and then automatically cuts off. By placing a 120 v operative relay RL1, 29, such that one of its terminals 31 receives electrical power only during the light's operative time frame when internal relay switch 33 is closed, usually ranges from 3 to 5 minutes (average of 4 minutes) and then automatically cuts off. By placing a 120 v operative relay RL1, 29, such that one of its terminals 31 receives electrical power only during the light's operative time frame when internal relay switch 33 is closed, power is supplied to fan's electrical motor 35 during the same time preset interval the garage opener's light is supplied power. This supply of electrical power causes the fan's blades to rotate exhausting gas from inside the garage to outside the garage through the venting assembly's 15 louvered, now opened, slats.

FIG. 3 shows a conventional garage door opener's light fixture 11 with an socket adapter 37 used to supply electrical power to the garage wall mounted ventilation fan 21. The socket adapter 37 screws into the normal bulb screw socket and permits the bulb to be screwed into it but also has a side additional outlet into which the plug end 39 for fan connecting wire 13 may be inserted. The previously mentioned FIG. 2 relay RL1 29 can be built into adapter 37 to insure the proper supply of power to fan 21.

A protective inner fan screen 41 encases the fan 21 and is mounted to the garage's wall to prevent bugs from entering the garage while allowing gas to freely pass. The movable louver horizontal slat vents 43 located outside the garage on an exterior side wall are in fluid communication with the interior of the garage and opened as shown. When closed, the louvers are parallel to the garages wall and prevent the entry of air into the interior of the garage. These movable louvers may be operated by a change in gas pressure or an interconnected separate electrical motor (not shown) set to operate in unison with fan motor. A smaller mesh additional screen, not show, may be placed between the fan's motor 35 and the outside louvers 43 to provide an additional prevent the entry of air into the interior of the garage. These movable louvers may be operated by a change in gas pressure or an interconnected separate electrical motor (not shown) set to operate in unison with fan motor. A smaller mesh additional screen, not show, may be placed between the fan's motor 35 and the outside louvers 43 to provide an additional barrier to the entry of unwanted bugs into the garage.

Conceivably, other less desirable electrically operated triggering mechanisms, could also be used to control the operate of the exhaust fan.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as my invention is:

1. A garage gas ventilation system comprising:
   an enclosed garage having garage walls and a garage door providing a gas confining space, said garage door adapted to operate and permit a vehicle to enter or exit from the enclosed garage;
   an electrically operative garage door opener having a light in said garage, said opener and opener light being connected to operate in response to the operation of the garage door;
   an electrically operated vent assembly adapted to be mounted on the garage and to provide a gaseous conduit to outside of the garage, said assembly including an electrically operated fan to exhaust gas from the garage;

means for triggering the operation of said fan responsive to the operation of the light on said electrically operated garage door opener whereby said operative fan exhausts the garage's internal gas from the garage to the outside.

2. The system as claimed in claim 1, wherein said garage door opener's light is supplied electrical power for a preset time interval; and said means for triggering the operation of said fan is operatively connected to said light fixture to trigger the operation of the fan during the same preset interval electricity is supplied to the light.

3. The system as claimed in claim 2, wherein said means for triggering the operation of said fan is operative connected to the light fixture by an electrically operated relay interconnecting the fan to the light.

4. The system as claimed in claim 3, wherein said electrically operated vent assembly has movable louvers which open to outside the garage when said fan is operative to exhaust gas from the garage.

5. The apparatus as claimed in claim 4, also including an outside air intake into the garage mounted on the garage.

6. The apparatus as claimed in claim 1, wherein said enclosed garage is attached to a personal residence by an interconnecting door.

\* \* \* \* \*